(12) United States Patent
Mosher

(10) Patent No.: US 6,652,036 B2
(45) Date of Patent: Nov. 25, 2003

(54) MUD COVER ASSEMBLY

(76) Inventor: Eugene L. Mosher, 890 Crestview La., Owatonna, MN (US) 55060

( * ) Notice: Subject to any disclaimer, the term of this patent is extended or adjusted under 35 U.S.C. 154(b) by 0 days.

(21) Appl. No.: 10/093,996

(22) Filed: Mar. 11, 2002

(65) Prior Publication Data

US 2003/0168906 A1 Sep. 11, 2003

(51) Int. Cl.$^7$ .............. B60B 7/00; B60B 7/12
(52) U.S. Cl. .............. 301/37.102; 301/37.32
(58) Field of Search .......... 301/37.101, 37.24, 301/37.102, 37.32, 37.34, 37.371, 37.35, 37.36, 37.42, 37.31, 37.12

(56) References Cited

U.S. PATENT DOCUMENTS

| | | | | |
|---|---|---|---|---|
| 2,625,439 A | * | 1/1953 | Horn | 301/37.35 |
| 2,865,682 A | * | 12/1958 | Lyon | 301/37.36 |
| 2,865,683 A | * | 12/1958 | Lyon | 301/37.36 |
| 3,010,764 A | * | 11/1961 | Hurd | 301/37.36 |
| 3,480,329 A | * | 11/1969 | Foster et al. | 301/37.32 |
| 3,671,076 A | * | 6/1972 | Aske, Jr. | 301/37.42 |
| 4,131,322 A | * | 12/1978 | Beisch et al. | 301/37.36 |
| 4,626,037 A | * | 12/1986 | Kushner | 301/108.4 |
| 4,738,490 A | * | 4/1988 | Loren | 301/37.35 |
| 5,046,784 A | * | 9/1991 | Carter, III | 301/37.36 |
| 5,131,726 A | * | 7/1992 | Collins | 301/37.36 |
| 5,340,201 A | * | 8/1994 | Weirs | 301/37.26 |
| 5,490,342 A | * | 2/1996 | Rutterman et al. | 40/587 |
| 5,542,751 A | * | 8/1996 | Russell | 301/37.32 |
| 5,695,257 A | * | 12/1997 | Wright et al. | 301/37.371 |
| 6,450,582 B2 | * | 9/2002 | Ichikawa et al. | 301/37.36 |

* cited by examiner

Primary Examiner—S. Joseph Morano
Assistant Examiner—Long Bao Nguyen
(74) Attorney, Agent, or Firm—Jacobson & Johnson

(57) ABSTRACT

A mud cap assembly for attachment to a wheel rim comprising a member expandable for forming interlocking engagement with a wheel rim, a cover having an outer surface to inhibit track material from accumulating thereon and a plurality of fasteners for temporarily securing the cover to the member so that track material impinging on the cover slides off the cover to inhibit the creation of an unbalanced condition.

16 Claims, 4 Drawing Sheets

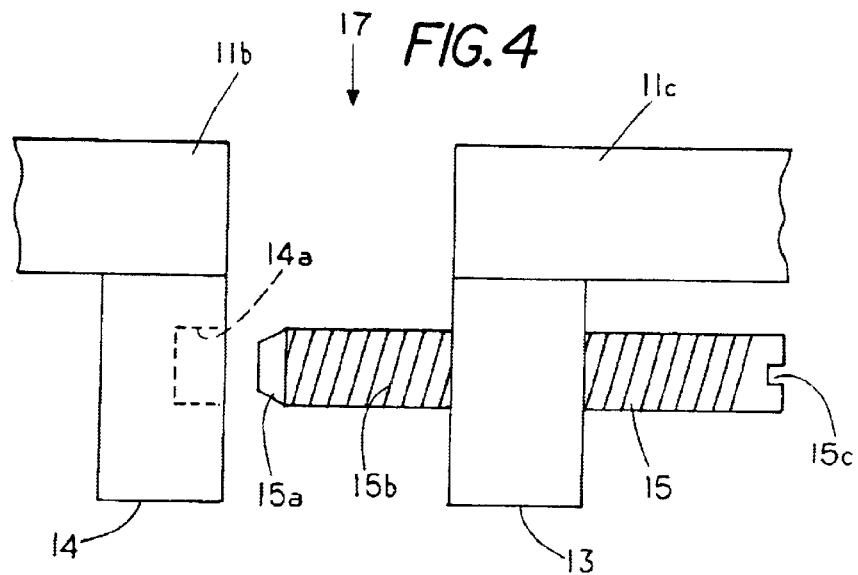
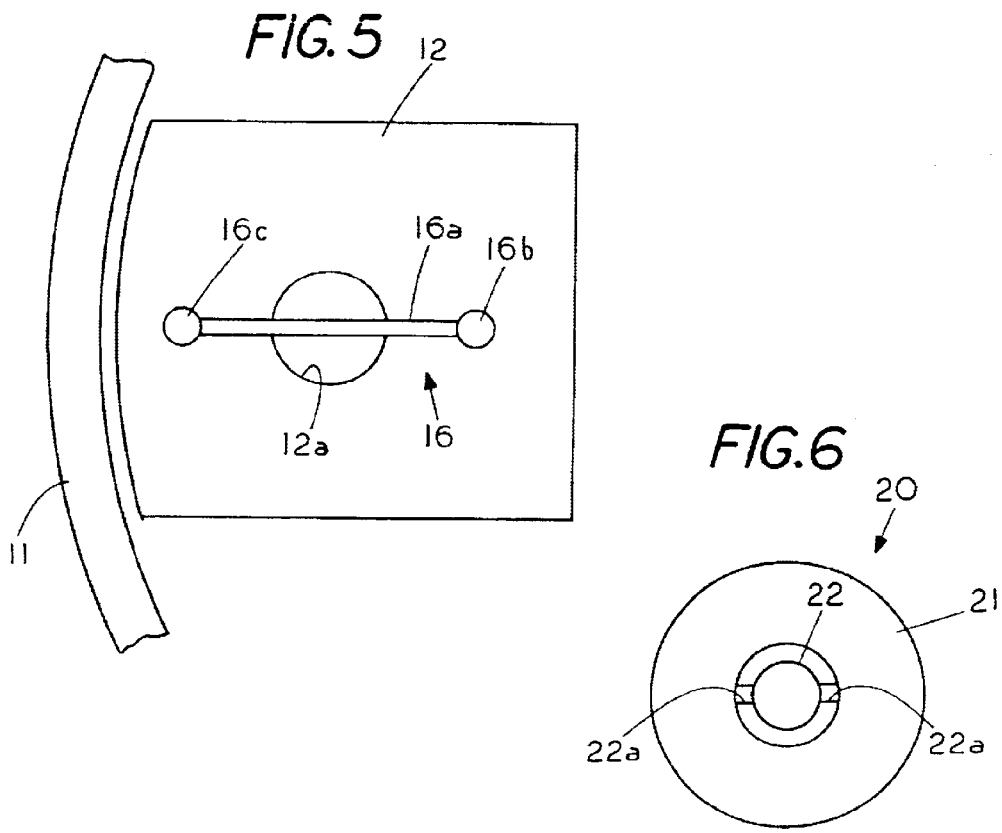

MUD COVER ASSEMBLY

FIELD OF THE INVENTION

This invention relates generally to wheel covers and, more specifically, to mud covers for removable attachment to a wheel rim of a vehicle to prevent track material from adhering to the wheel rim and thereby cause the wheel to become unbalanced.

CROSS REFERENCE TO RELATED APPLICATIONS

None

STATEMENT REGARDING FEDERALLY SPONSORED RESEARCH OR DEVELOPMENT

None

REFERENCE TO A MICROFICHE APPENDIX

None

BACKGROUND OF THE INVENTION

The concept of covers for wheels for decorative purposes as well as for preventing dirt and other materials from adhering to the cover is known in the art. In the art of dirt track racing, where the vehicles race around an oval or round track, the outer wheels of the vehicle slide radially outward due to the centrifugal force on the vehicle. As a result the track material, which is usually soil, is forced against the rims of the wheel resulting in at least some of the soil adhering to the rim causing the wheel to become unbalanced.

While various mud covers have been proposed, the mud covers need to shed any soil that impacts thereon as well as mountable to existing wheel rims in a sufficiently securable condition to maintain the mud cover thereon as the vehicle encounters the forces and stresses produces by the tires and wheels sliding on the track. Vehicle sliding is particular acute as the vehicle races around a curved track. That is, as the vehicle circles a race track the outer wheels slide radially outward across the track causing soil on the track to impact the wheel rim. If the soil is moist or otherwise sticky the soil can adhere to the wheel rim creating an unbalanced wheel condition.

In order to minimize the unbalanced condition the outer rear wheels are often provided with an integral cover while the outer front wheel is often left uncovered. The present invention provides a mud cover assembly for a wheel rim that provides interlocking engagement with the wheel rim without the necessity to altar the wheel rim. In particular the present invention is suitable for use on front wheels of a dirt track racing vehicle or other vehicles that are driven in conditions where mud or the like can produce an unbalanced wheel condition.

SUMMARY OF THE INVENTION

A mud cap assembly for attachment to a wheel rim comprising a member expandable for forming interlocking engagement with a wheel rim, a cover having an outer surface to inhibit track material from accumulating thereon and a plurality of fasteners for temporarily securing the cover to the member so that track material impinging on the cover slides off the cover to inhibit the creation of an unbalanced condition.

BRIEF DESCRIPTION OF THE DRAWINGS

FIG. 4 is an enlarged view of a hoop contraction and lengthening device for placing the hoop into interlocking or non-interlocking engagement with a wheel rim;

FIG. 5 is a partial top view of a flange and fastener receptacle secured to the hoop member;

FIG. 6 is an end view of a rotatable fastener of FIG. 4;

DESCRIPTION OF THE PREFERRED EMBODIMENT

The mud cap assembly for attachment to a wheel rim includes an expandable member for forming interlocking engagement with a wheel rim, a cover having an outer surface to inhibit track material from accumulating thereon and a plurality of fasteners for temporarily securing the cover to the member so that track material impinging on the cover slides off the cover to inhibit the creation of an unbalanced condition.

Figure 1:
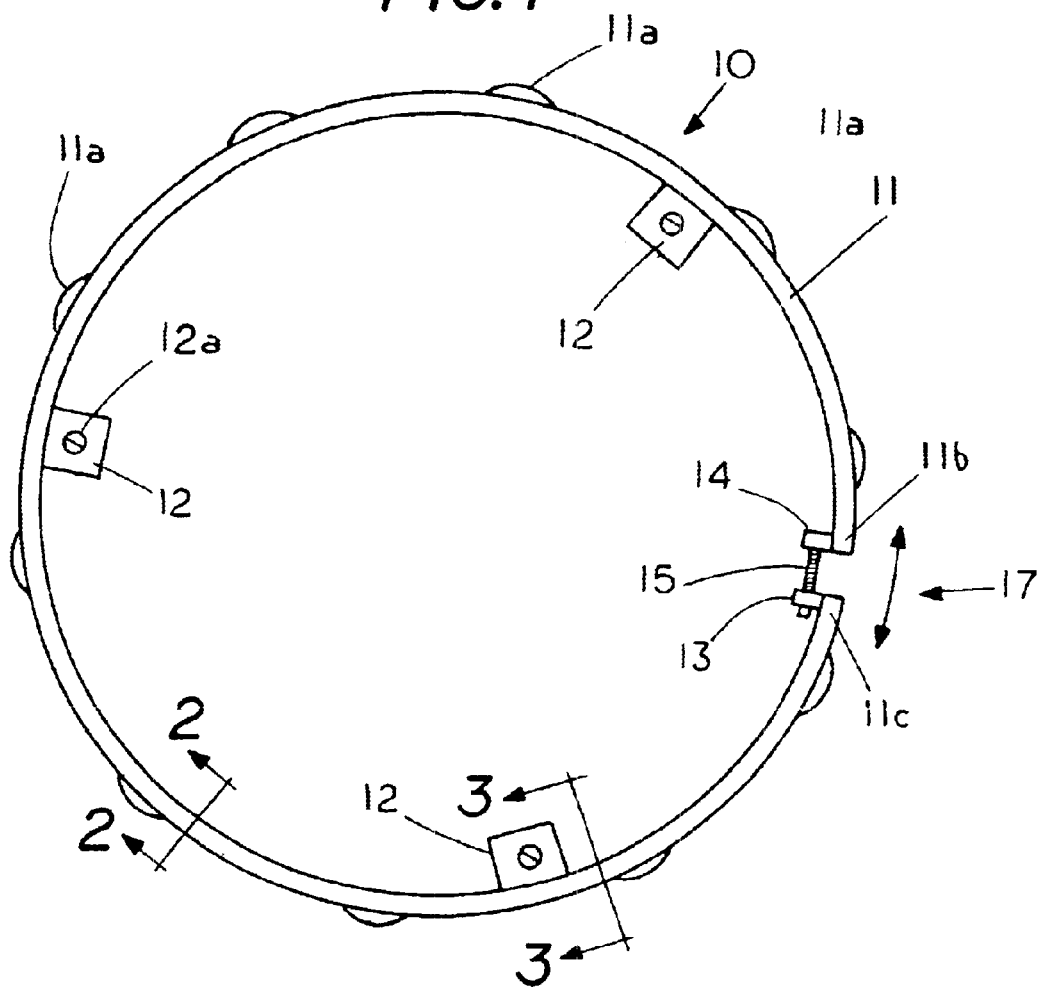
FIG. 1 is front view of a hoop member for forming interlocking engagement with a wheel rim.

FIG. 1 shows a front view of the expandable member 10 for forming interlocking engagement with an existing circumferential groove in a wheel rim with member 10 including a set of flanges 12 each carrying fastener receptacles for removably supporting a wheel cover thereon. A feature of member 10 is that member 10 can be secured to a wheel rim without the need to altar the wheel rim. Thus member provides a fixed frame that can be used to support a circular wheel cover thereon.

Expandable member 10 comprises a circular hoop formed from an elongated strip of rigid material such as metal. Hoop 10 has a first split end 11b and a second split end 11c fitted with a hoop expanding member 17. Hoop expanding member 17 includes a stop 14 located on and secured to spilt end 11b, an internally threaded member 13 located on and secured to the other split end 11c and a threaded member 15. The female thread in member 13 rotatably supports threaded member 15 therein to permit axial displacement of threaded member 15 with respect to member 13. One end of threaded member 15 abuts against stop 14 so that rotation of thread member 15 in a first direction pushes the split ends apart to circumferentially and radially expand the circumference of hoop 10 to bring hoop 10 into interlocking engagement with a wheel rim. Rotation of threaded member 15 in the opposite direction brings the split ends together to bring hoop 10 into non interlocking engagement with the wheel rim.

FIG. 4 shows a detail view of hoop expanding member 17 showing stop 14 secured to split end 11b with stop 14 containing a recess 14a (dotted lines) thereon for rotational abutment with end 15a of threaded member 15. Recess 14a ensures that the end of the threaded member 15 is confined therein so that a force on stop 14 causes circumferential expansion of hoop member 10. Member 13, which can comprise a nut or the like, is secured to spilt end 11c and rotationally caries the rotatable member 15 which has a male thread 15b for rotational engagement with the female threads in member 13. A screwdriver blade slot 15c in one end of threaded member 15 permits rotation of member 15. If desired other tool engagement heads such as socket heads could be used on threaded member 15. To produce axial travel of end 15a in a first direction one can rotate member 15 in a clockwise direction and to produce axial travel in an opposite direction one can rotate in a counter clockwise direction. Thus it will be appreciated that the rotation of rotatable member 15 in one direction causes circumferential expansion of hoop 11 which also results in radial expansion of hoop 11 to bring the plurality of radial protrusions 11a located thereon into locking engagement with a wheel rim. While a plurality of protrusions 11a are shown a single continuous protrusions could also be used for forming locking engagement with the wheel rim.

Although member 10 is circumferentially expandable to form interlocking engagement it is envisioned that a spider like frame with expandable radially legs could also be used to secure the member to the wheel rim. However, a circumferentially expanding member 10 produces an advantage in attachment to a rim since only a single rotatable member 15 need by engaged to bring member 10 into interlocking circumferential engagement with the wheel rim.

Figure 2:
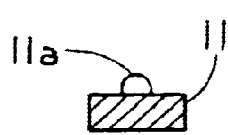
FIG. 2 is a cross sectional view taken along lines 2—2 of FIG. 1.

FIG. 2 is a cross sectional view taken along lines 2—2 of FIG. 1 illustrating member 11 in cross section with radial protrusions 11a extending radially outward from hoop 11 to form locking engagement with the wheel rim. Although protrusions are used it is envisioned that depending on the size of the circumferential groove in the wheel protrusions need not always be used to obtain interlocking engagement between the wheel rim and the hoop.

In the use of the invention the aforedescribed hoop member 10 is fixedly secured to the wheel rim by rotation of threaded member 15. Once the hoop member 10 is secured to the rim it provides a frame for supporting and removably attaching a removable mud cover thereto.

Figure 3:
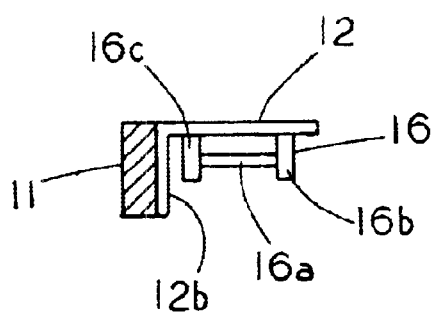
FIG. 3 is a cross sectional view taken along lines 3—3 of FIG. 1.

In order to secure and support a removable mud cover to hoop 10 there are provided a set of flanges 12. FIG. 1 shows a front view of the set of flanges 12 that are circumferentially spaced and secured to hoop 11 with the flanges extending radially inward from hoop 11 to provide support for a mud cover. Each of the flanges 12 carry a fastener receptacle with each of flanges 12 including an access hole 12a for penetration of a fastener therethrough. FIG. 3 is a cross sectional view taken along lines 3—3 of FIG. 1 showing a side view of flange 12 and revealing an L shaped flange 12, which is fixedly secured to hoop 11 along extension 12b, with a fastener receptacle 16 comprising a set of supports 16b and 16c having a cylindrical pin 16a extending therebetween.

FIG. 5 is a bottom view of flange 12, which is secured to hoop 11 by welding or the like. Fastener receptacle 16 is secured to flange 12 by supports 16b and 16c with pin 16a extending diametrically across opening 12a in flange 12.

Figure 6A:
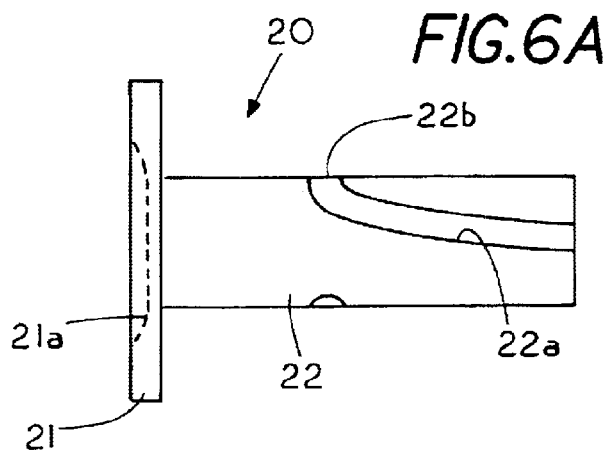
FIG. 6a is a side view of the rotatable fastener for securing a mud cover to the hoop member of FIG. 1.

Referring to FIG. 6 and 6a there is shown a rotateable fastener 20 for forming interlocking engagement with the fastener receptacle 16. Rotateable fastener 20 includes a head 21 having a slot 21a for engagement with a screwdriver or the like and a shaft 22 having a curved slot therein. The curved slot in shaft 22 comprises a first axially extending region 22a and a second radially extending region 22b. Slot regions 22a and 22b are sufficiently wide so as to permit pin 16a to slidingly pass there along so that by pushing inward and rotating fastener 20 one can bring shoulder 22b of shaft 20 into locking engagement with pin 16a. Rotateable fasteners 20 and fastener receptacles are commercially available and provide for secure attachment with only a partial rotation of fastener 20. If desired a conventional threaded fastener, such as a stub bolt, could be used in conjunction with a threaded receptacle such as a nut, which is secured to the flange.

In operation of the present invention a portion of the removable fasteners 20 extend through a wheel cover to form locking engagement with the fastener receptacle 16 in each of flanges 12 to permit a user to quickly secure a wheel cover to the hoop to thereby prevent track material from accumulating thereon and creating an unbalanced condition.

Figure 7:
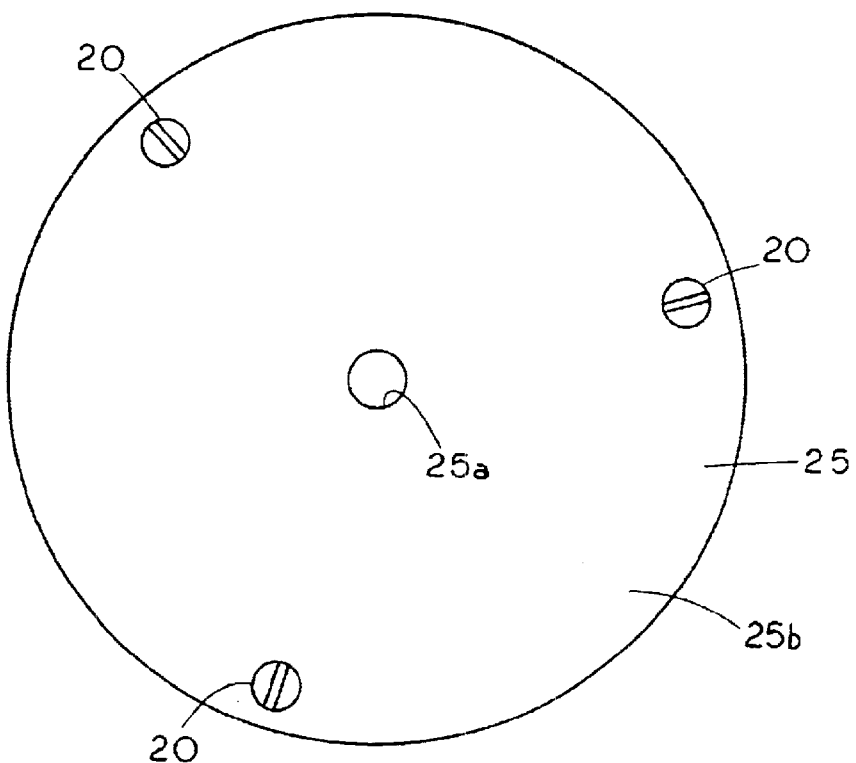
FIG. 7 is a front view of the mud cover for mounting on the hoop member of FIG. 1.

FIG. 7 shows a front view of a circular, rigid, mud cover 25 with cover 25 having a smooth, planar outer surface 25 substantially free of any recesses or protrusions to retain track material thereon. That is, configuration of cover 25 is such that it inhibits the retention of road materials thereon by allowing the centrifugal force to prevent materials from adhering to the mud cover.

For convenience in removing wheel cover 25 there is provided a finger hole 25a in the center of wheel cover. Wheel cover can be made from plastic materials such as polycarbonate or the like. Mud cover 25 is generally symmetrical so as not to introduce dynamic unbalance to the wheel. Similarly, the hoop member and flanges are symmetrical configured so as to avoid dynamic unbalance with rotation of the wheel.

Figure 8:
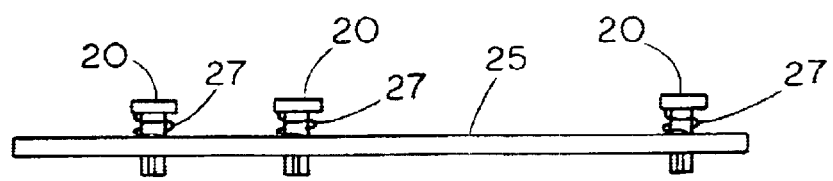
FIG. 8 is a side view of the mud cover of FIG. 7.

FIG. 8 is a side view of wheel cover 25 showing rotatable fasteners 20 extending outward from wheel cover 25 by virtue of compression springs 27. Each of rotateable fasteners 20 are axially retained in cover 25 to aid in the quick installation of the wheel cover. The compression springs function to place the fasteners 20 in a ready condition so that by combination of an inward force on fastener 25 followed by a rotational force one can quickly lock the cover 25 to a wheel rim.

Figure 9:
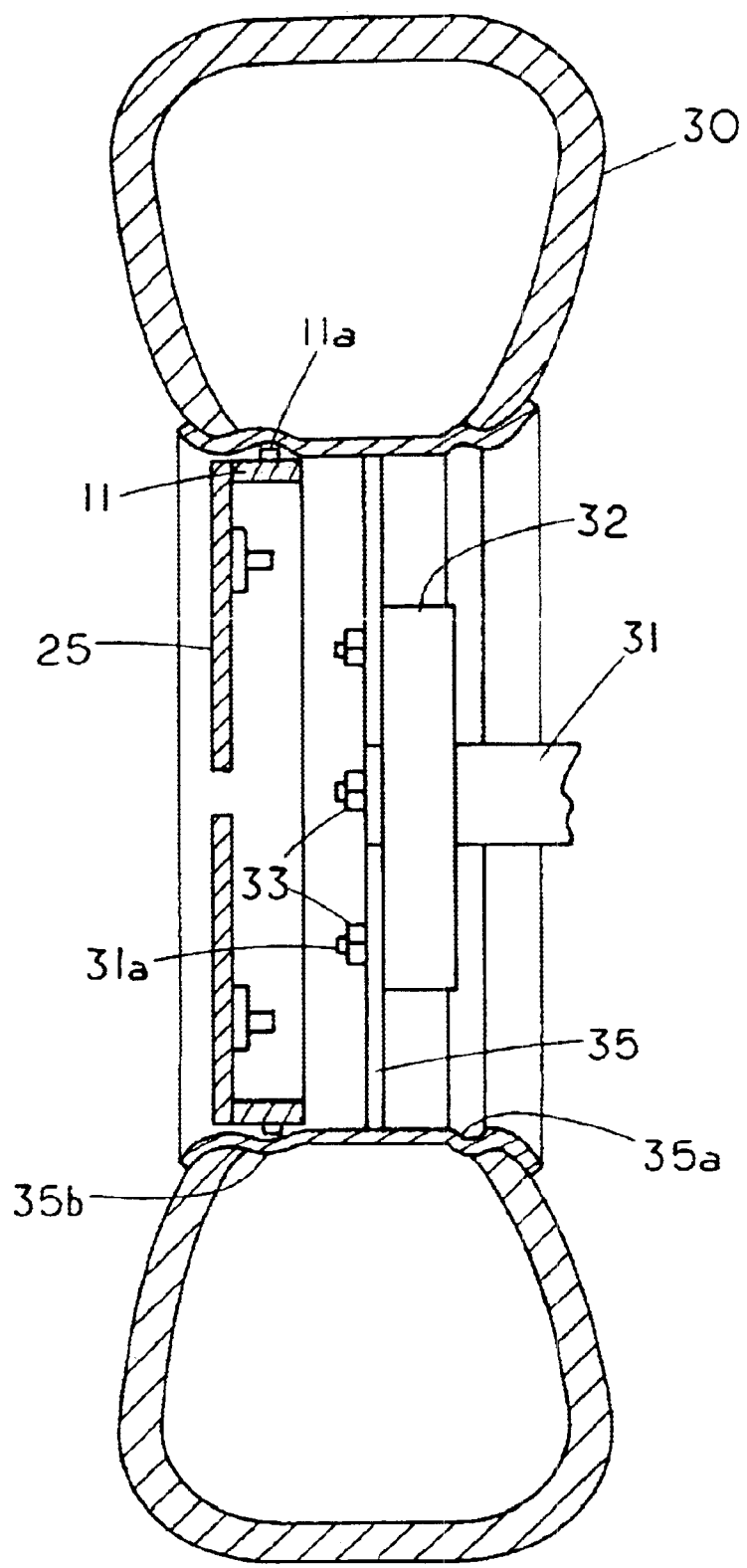
FIG. 9 is a cross sectional view of a wheel and rim showing the interlocking mounting of the hoop member on a shoulder of a circumferential recess located in the wheel rim.

FIG. 9 is a cross sectional view of a vehicle wheel having my mud cover 25 thereon. A shaft 31 having a flange 32 with studs 31 a extend though rim 35. Lug nuts 33 maintain rim 35 in a fixed condition with respect to shaft 31. Rim 35 carries an inflated tubeless tire 30 thereon. A characteristics of wheel rims for inflatable tires is that the rims contain a first outer circumferential groove 35a and a second outer circumferential groove 35b which are formed in the rim to produce inner circumferential ridges for forming a lip for engagement with the circumferential edges of the tubeless tire 30. It is the presence of a circumferential groove on the exterior of the rim that enables one to lockingly secure my hoop member 11 to the U-shaped shoulder 35b in rim 35. As can be seen in FIG. 9 the wheel cover 25 is mounted to hoop member 11 which is in turn interlocked with rim 35 without recourse to altering the wheel rim 35.

FIG. 9 reveals that when assembled the heads 21 of fasteners 20 fit in a recess (not shown) to allow the fasteners to be maintained in a flush condition with cover 25 and thereby prevent accumulation of track material on the fasteners.

Thus the present invetion includes a wheel attachment member 10 that is expandable for forming interlocking engagement with a circumferential recess in a wheel rim and a plurality of fasteners 16 thereon for temporarily securing a mud cap thereto.

I claim:

1. A mud cap assembly for attachment to a wheel rim comprising:

a member, said member expandable for forming interlocking engagement with a circumferential recess in a wheel rim, said member having a set of radial protrusions for forming interlocking engagement with the circumferential recess;

a cover, said cover having an outer surface to inhibit accumulation of road material thereon; and a plurality of fasteners for temporarily securing said cover to a hoop.

2. The mud cap assembly of claim 1 wherein the cover is circular.

3. The mud cap assembly of claim 1 wherein the cover extends radially coextensive with said member.

4. The mud cap assembly of claim 1 wherein the fasteners include rotatable fasteners.

5. The mud cap assembly of claim 1 wherein the fasteners have flat heads to prevent accumulation of track material thereon.

6. The mud cap assembly of claim 1 wherein the fasteners are flush mounted to prevent accumulation of track material on the fasteners.

7. The mud cap assembly of claim 1 wherein the cover includes a central opening for ease in removing the cover from the member.

8. A mud cap assembly for attachment to a wheel rim comprising:

a member, said member expandable for forming interlocking engagement with a circumferential recess in a wheel rim, said member having a threaded male member rotatably supported on a first split end of said member and a stop on a second split end of said member to permit circumferential expansion of said member to thereby bring said member into the interlocking engagement;

a cover, said cover having an outer surface to inhibit accumulation of road material thereon; and a plurality of fasteners for temporarily securing said cover to a hoop.

9. A mud cap assembly for attachment to a wheel rim comprising:

a member, said member expandable for forming interlocking engagement with a circumferential recess in a wheel rim;

a cover, said cover having an outer surface to inhibit accumulation of road material thereon; and a plurality of fasteners for temporarily securing said cover to a hoop; said fasteners comprising a shaft having an axial extending slot and a radial extending shoulder so that rotation of the fastener about a transverse member causes said transverse member to be drawn toward the fastener as the transverse member is brought into engagement with the radial extending shoulder.

10. The mud cap assembly of claim 1 wherein the member is a hoop.

11. The mud cap assembly of claim 1 wherein the member contains three radially extending flanges for supporting and securing the cover thereto.

12. A mud cap assembly for attachment to a wheel rim comprising:

a member, said member expandable for forming interlocking engagement with a circumferential recess in a wheel rim;

a cover, said cover having an outer surface to inhibit accumulation of road material thereon; and a plurality of fasteners for temporarily securing said cover to a hoop; said fastener including a compression spring for extending the fasteners outward from the cover when the fasteners are in an unsecured condition.

13. The mud cap assembly of claim 1 wherein the fasteners are rotatably mounted and axially secured to said cover to maintain the fasteners in a condition for quick mounting or demounting of said cover.

14. The mud cap assembly of claim 1 wherein the cover comprises a plastic disk and the member comprises a metal hoop.

15. The mud cap assembly of claim 1 wherein the cover and the member comprise separable components to permit replacement of a cover.

16. A mud cap assembly for attachment to a wheel rim comprising:

a hoop, said hoop comprising an elongated strip of material having a first end and a second end;

a member having a female thread secured to one of the ends of said hoop;

a stop secured to the other end of said hoop;

a threaded member rotatably mounted in said female thread and abutting against said stop so that rotation of said thread member in a first direction circumferential expands the circumference of said hoop to bring said hoop into locking engagement with a circumferential recess in a wheel rim;

a set of flanges extending radially inward from said hoop, each of said flanges carrying a fastener receptacle;

a wheel cover, said wheel cover having an outer surface free of a recess to retain track material thereon; and a set of removable fasteners, said fasteners extending through said wheel cover to form locking engagement with the fastener receptacle in each of said flanges to permit a user to secure the wheel cover to the hoop to thereby prevent track material from accumulating thereon and creating an unbalanced condition.

* * * * *